(12) United States Patent
Otsuki et al.

(10) Patent No.: US 11,413,649 B2
(45) Date of Patent: Aug. 16, 2022

(54) VISCOUS MATERIAL DISCHARGE DEVICE

(71) Applicant: KAWASAKI JUKOGYO KABUSHIKI KAISHA, Kobe (JP)

(72) Inventors: Naohiro Otsuki, Kakamigahara (JP); Toshihiko Ito, Kakamigahara (JP); Akihito Sakai, Gifu (JP)

(73) Assignee: KAWASAKI JUKOGYO KABUSHIKI KAISHA, Kobe (JP)

(*) Notice: Subject to any disclaimer, the term of this patent is extended or adjusted under 35 U.S.C. 154(b) by 113 days.

(21) Appl. No.: 16/809,549

(22) Filed: Mar. 5, 2020

(65) Prior Publication Data

US 2020/0197974 A1 Jun. 25, 2020

Related U.S. Application Data

(63) Continuation of application No. PCT/JP2018/032667, filed on Sep. 3, 2018.

(30) Foreign Application Priority Data

Sep. 8, 2017 (JP) .............................. JP2017-172684

(51) Int. Cl.
*B05C 11/10* (2006.01)
*B05C 5/02* (2006.01)
(Continued)

(52) U.S. Cl.
CPC ........ *B05C 11/1002* (2013.01); *B05C 5/0216* (2013.01); *B05C 11/1005* (2013.01);
(Continued)

(58) Field of Classification Search
None
See application file for complete search history.

(56) References Cited

U.S. PATENT DOCUMENTS

| 5,292,066 A | 3/1994 | Torii et al. |
| 6,527,142 B1 * | 3/2003 | Ikushima .............. B05C 5/0225 222/61 |

(Continued)

FOREIGN PATENT DOCUMENTS

| DE | 10 2011 011545 A1 | 8/2012 |
| JP | 07-024390 A | 1/1995 |

(Continued)

OTHER PUBLICATIONS

Extended European search report dated Nov. 26, 2020, in corresponding European patent Application No. 18854239.3, 7 pages.

*Primary Examiner* — Jethro M. Pence
(74) *Attorney, Agent, or Firm* — Xsensus LLP

(57) ABSTRACT

A controller controls a plunger to operate at a measurement speed and discharge the viscous material from the nozzle before applying the viscous material to the workpiece. The controller measures a period of time, from when the plunger starts operating at the measurement speed until a discharge amount of the viscous material reaches a predetermined value, as a time delay amount. The controller further determines an operation speed of the plunger and/or a moving speed of the nozzle during application of the viscous material to the workpiece according to the measured time delay amount.

3 Claims, 3 Drawing Sheets

(51) Int. Cl.
*B05D 7/24* (2006.01)
*B25J 11/00* (2006.01)

(52) U.S. Cl.
CPC ............ *B05C 11/1015* (2013.01); *B05D 7/24* (2013.01); *B25J 11/0075* (2013.01)

(56) References Cited

U.S. PATENT DOCUMENTS

| | | | |
|---|---|---|---|
| 7,963,246 B1 * | 6/2011 | Brinker | B05C 5/0216 |
| | | | 118/712 |
| 2019/0344293 A1 * | 11/2019 | Knott | B05B 12/004 |

FOREIGN PATENT DOCUMENTS

| | | |
|---|---|---|
| JP | 07-124509 A | 5/1995 |
| JP | 2001-239197 A | 9/2001 |
| JP | 2011-235237 A | 11/2011 |
| JP | 2017-23916 A | 2/2017 |
| WO | 2017/134438 A1 | 8/2017 |

\* cited by examiner

VISCOUS MATERIAL DISCHARGE DEVICE

CROSS-REFERENCES TO RELATED APPLICATIONS

The present application is a bypass continuation of PCT Application No. PCT/JP2018/032667, filed Sep. 3, 2018, which claims priority to JP 2017-172684, filed Sep. 8, 2017, both of which are incorporated herein by reference.

TECHNICAL FIELD

The present application relates to a device for discharging a viscous material.

BACKGROUND ART

At a manufacturing site for vehicles and industrial machinery, automation of the work of applying a viscous material to the joint of two parts is underway. For example, a conventional discharge device may discharge a sealant filled in a cartridge from a nozzle by pressing a sealant with a pusher. The moving speed of the pusher is changed between a first period before application of the sealant and the second period during application. The moving speed in the first period is set according to the viscosity estimated based on the temperature, the humidity, and the material of the sealant.

However, due to a temperature distribution in the cartridge and other conditions, the viscosity of the sealant filled in the cartridge is in a widely distributed state. Therefore, it is difficult to accurately estimate the viscosity of the sealant. Even if the moving speed is set according to the estimated viscosity, it is difficult to control the discharge amount of the sealant as expected. To increase the estimation accuracy, a large number of sensors are required, and the discharge device becomes complicated.

SUMMARY

A viscous material discharge device according to an aspect of the present application is a device that discharges a viscous material and applies the discharged viscous material to a workpiece in a bead shape. The device comprises a reservoir for storing the viscous material; an extrusion mechanism for extruding the viscous material in the reservoir by a plunger; a nozzle for discharging the viscous material extruded from the reservoir by the plunger; a holding member for holding the nozzle; a nozzle moving mechanism for moving the holding member and the nozzle held by the holding member; and a controller, in which the controller is configured to cause the plunger to operate at a measurement speed and discharge the viscous material from the nozzle before applying the viscous material to the workpiece, measure a time from when the plunger starts operating at the measurement speed until a discharge amount of the viscous material reaches a predetermined value as a time delay amount, and determine an operation speed of the plunger and/or a moving speed of the nozzle during application of the viscous material to the workpiece according to the measured time delay amount.

DETAILED DESCRIPTION OF THE DRAWINGS

Figure 1:
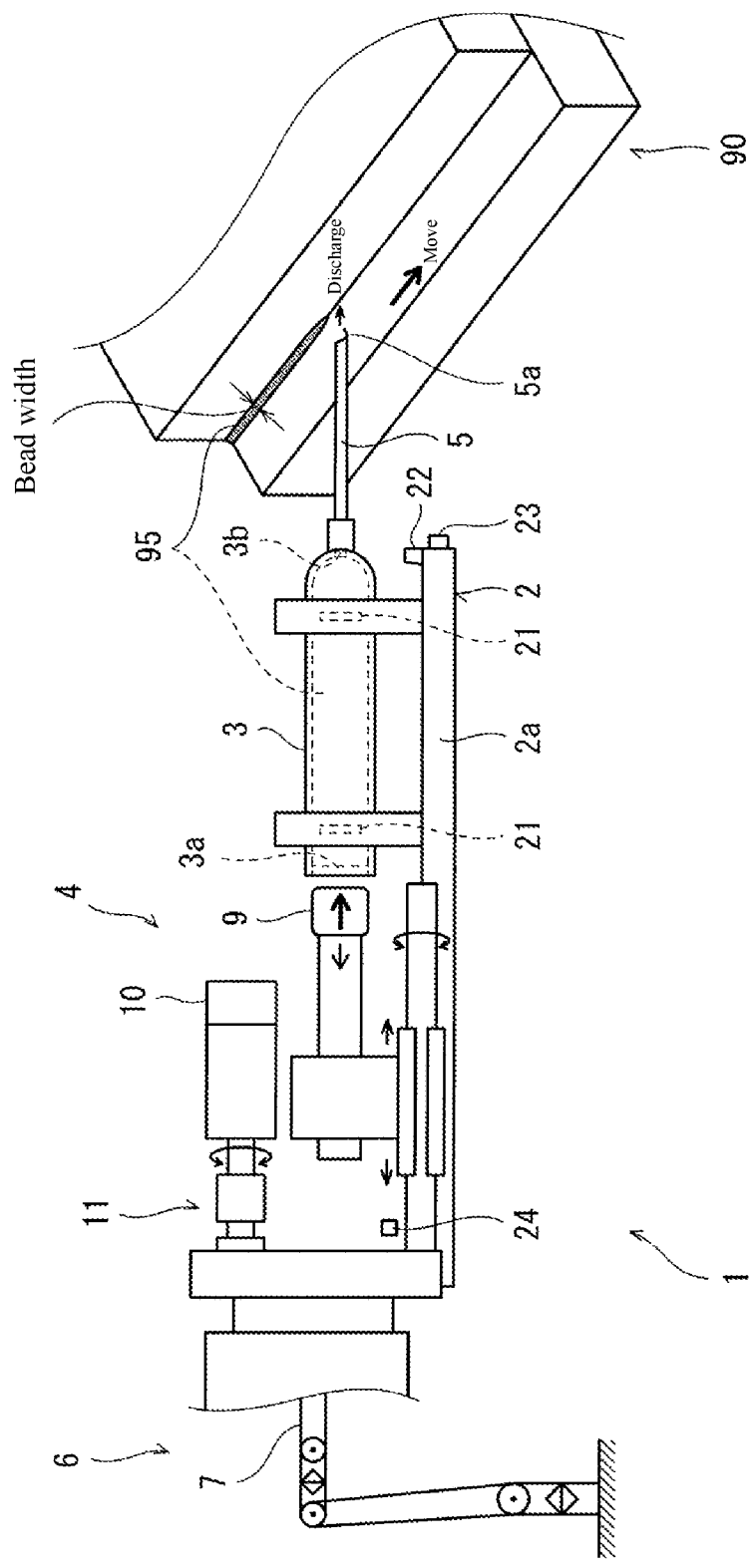
FIG. 1 illustrates an exemplary configuration of a viscous material discharge device according to an embodiment.

Hereinafter, embodiments will be described with reference to the drawings. Throughout the drawings, the same or corresponding elements are denoted by the same reference numerals, and repeated description is omitted.

FIG. 1 illustrates an exemplary configuration of a viscous material discharge device 1 (hereinafter referred to as discharge device 1). As shown in FIG. 1, the discharge device 1 includes a holding member 2 that holds a reservoir 3, an extrusion mechanism 4, and a nozzle 5. The holding member 2 has a base 2a formed in a long plate shape, and the extrusion mechanism 4, the reservoir 3, and the nozzle 5 are arranged in this order in the longitudinal direction of the base 2a. The viscous material 95 is discharged from the tip of the nozzle 5.

The discharge device 1 includes a nozzle moving mechanism 6 that moves the holding member 2 and the nozzle 5 held by this. In the present embodiment, the nozzle moving mechanism 6 is composed of an industrial vertical articulated robot, and includes a robot arm 7 having a plurality of joints and a plurality (the same number of joints) of moving actuators 8 (see FIG. 2) that respectively drive the plurality of joints. The holding member 2 holding the nozzle 5 is detachably attached to the tip of the robot arm 7. When the robot arm 7 operates, the holding member 2 and the nozzle 5 held by this move together with the reservoir 3 and the extrusion mechanism 4. By moving the nozzle 5 while discharging the viscous material 95 from the nozzle 5, the discharged viscous material 95 is applied to a workpiece 90 in a bead shape.

The discharge device 1 may be applied to a vehicle (for example, an aircraft or an automobile) or an industrial machine manufacturing site. The viscous material is a material having viscosity such as a sealant or an adhesive. In the application work of the sealant at an aircraft manufacturing site, the workpiece 90 may be a segment constituting a cylindrical airframe. Further, a sealant having high viscoelasticity (for example, a viscosity of 1000 to 2000 Pa·s) is used, and the tolerance of the bead width is extremely small.

The reservoir 3 stores the viscous material 95. In the present embodiment, the reservoir 3 is a cartridge that is detachably attached to the holding member 2, and the replenishment of the viscous material 95 is realized by exchanging the cartridge.

The reservoir 3 is formed in a cylindrical shape, and the reservoir 3 is held by the holding member 2 such that the axial direction of the reservoir 3 is parallel to the longitudinal direction of the base 2a A wall on the base end side of the reservoir 3 constitutes a movable wall 3a that can move in the axial direction, and an outflow port 3b that allows the viscous material 95 to flow out is provided on the wall on the distal end side of the reservoir 3. The nozzle 5 is formed in a tapered cone shape whose both ends are open, and a base end portion having a relatively large diameter communicates with the outflow port 3b of the reservoir 3.

The extrusion mechanism 4 extrudes the viscous material 95 in the reservoir 3. The extrusion mechanism 4 includes a plunger 9 that extrudes the viscous material 95 in the reservoir 3, and an extrusion actuator 10 that actuates the plunger 9. The plunger 9 is disposed so as to be linearly movable in the axial direction of the reservoir 3 or the longitudinal direction of the base 2a. The extrusion actuator 10 is an electric motor as an example. In that case, the extrusion mechanism 4 includes a motion conversion mechanism 11 that converts the rotational power generated by the extrusion actuator 10 into a linear thrust and transmits the linear thrust to the plunger 9. The motion conversion mechanism 11 includes a ball screw mechanism as an example. The extrusion actuator 10 may be a linear actuator such as a piston. In this case, the motion conversion mechanism 11 can be omitted.

When the extrusion actuator 10 is actuated, the plunger 9 is moved linearly, whereby the movable wall 3a is pushed by the plunger 9. The movable wall 3a moves to the tip end side in the axial direction by the thrust of the plunger 9, and the internal volume of the reservoir 3 becomes small. The viscous material 95 is extruded to the nozzle 5 through the outflow port 3b by the reduced volume. The viscous material 95 extruded from the reservoir 3 is discharged from the tip of the nozzle 5.

The discharge amount per unit time of the viscous material 95 and the moving speed of the nozzle 5 control the amount (volume or weight) of the viscous material discharged from the nozzle 5 while the nozzle 5 moves a unit distance, and thereby the bead width of the viscous material 95 applied to the workpiece 90 is controlled. The moving speed accuracy of the nozzle 5 is higher than the discharge amount accuracy of the viscous material 95. Therefore, in order to improve the control accuracy of the bead width, it is important to improve the control accuracy of the discharge amount per unit time of the viscous material 95.

Even if the rotational force generated in the extrusion actuator 10, the thrust of the plunger 9, and furthermore the moving speed of the plunger 9 are the same, the discharge amount per unit time varies with the passage of time. This is because the viscosity in the reservoir 3 changes over time, and when the remaining amount of the viscous material 95 in the reservoir 3 decreases, the pressure transmitted to the tip of the nozzle 5 decreases based on the thrust of the plunger 9.

The viscous material 95 may be prepared by mixing two liquids. In this case, as a result of the chemical reaction of the two liquids, the viscous material 95 exhibits required performance such as hardness and sealability. As time elapses, the progress of the chemical reaction in the reservoir 3 varies, and the viscosity varies greatly accordingly. When the viscous material is prepared by mixing two liquids, an unused reservoir 3 (cartridge) may be stored frozen in order to prevent a chemical reaction from proceeding. In this case, immediately after replacement, the temperature of the viscous material in the reservoir 3 (new cartridge) is less than 0° C., which is lower than the air temperature (for example, 10 to 30° C.) at the work site. For this reason, the temperature fluctuation range of the viscous material with the passage of time is large, and thereby the viscosity is also greatly changed.

The internal temperature of the reservoir 3 does not rise uniformly, and the chemical reaction in the reservoir 3 does not progress uniformly. Therefore, the viscosity is widely distributed in the reservoir 3.

In light of the above circumstances, the controller 20 (see FIG. 2) of the discharge device 1 according to the present embodiment controls the operation of the extrusion mechanism 4 without depending on the estimation or measurement of the viscosity, and thereby improves control accuracy of the discharge amount per unit time.

Figure 2:
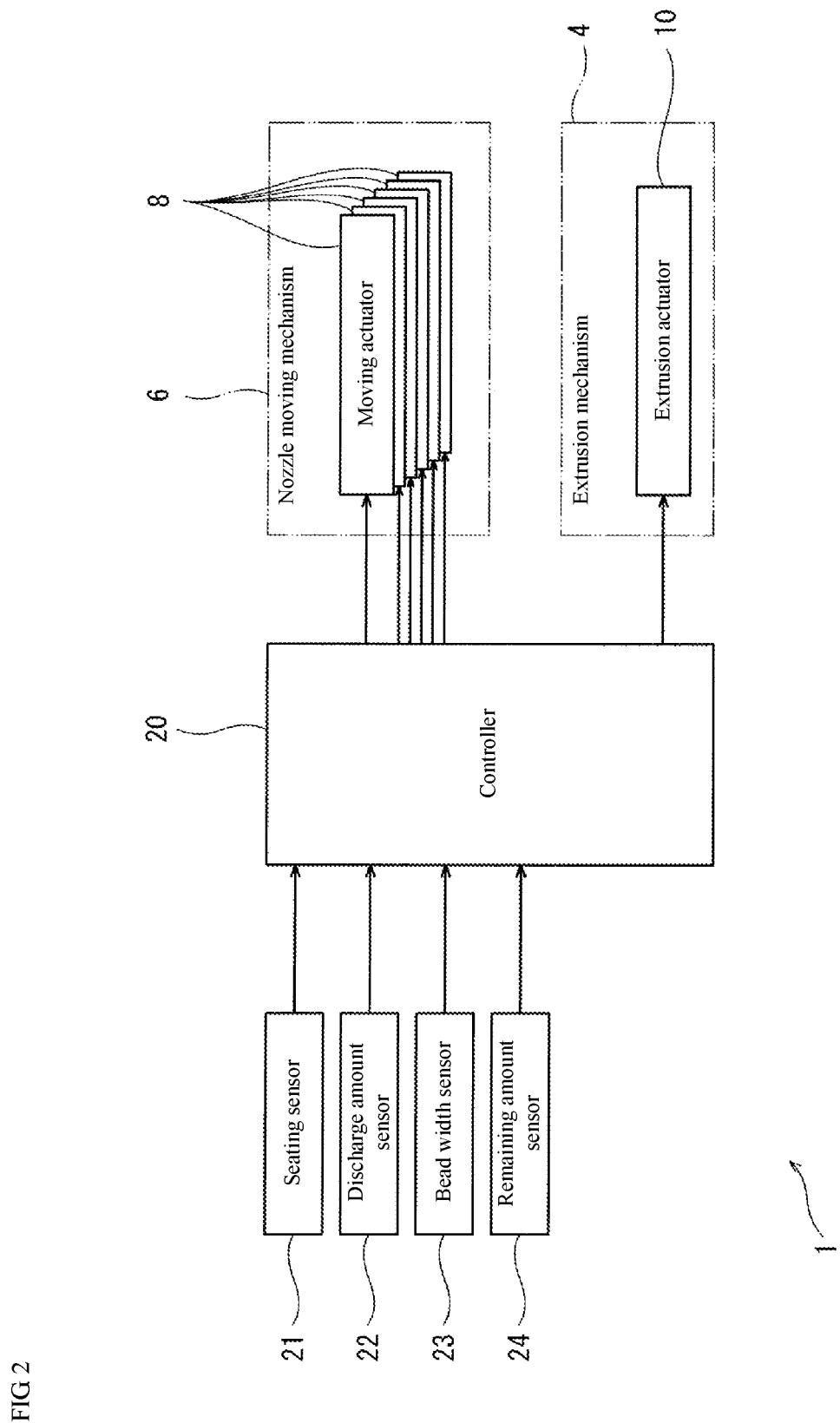
FIG. 2 illustrates a block diagram showing a viscous material discharge device.

FIG. 2 is a block diagram of the discharge device 1 according to the present embodiment. As shown in FIG. 2, the moving actuator 8 of the nozzle moving mechanism 6 and the extrusion actuator 10 of the extrusion mechanism 4 are controlled by the controller 20. The controller 20 is, for example, a computer having a memory such as ROM and RAM and a CPU, and a program stored in the ROM is executed by the CPU. The controller 20 may be a single device or may be divided into a plurality of devices.

Moreover, the functionality of the controller 20 disclosed herein may be implemented using circuitry or processing circuitry which includes general purpose processors, special purpose processors, integrated circuits, ASICs ("Application Specific Integrated Circuits"), conventional circuitry, controllers, and/or combinations thereof which are configured or programmed to perform the disclosed functionality. Processors and controllers are considered processing circuitry or circuitry as they include transistors and other circuitry therein. In this disclosure, any circuitry, units, controllers, or means are hardware carry out or are programmed to perform the recited functionality. The hardware may be any hardware disclosed herein or otherwise known which is programmed or configured to carry out the recited functionality. When the hardware is a processor or controller which may be considered a type of circuitry, the circuitry, means, or units are a combination of hardware and software, the software being used to configure the hardware and/or processor.

In the present embodiment, the program stored in the ROM includes a program that teaches a moving locus and a moving speed of the tip of the robot arm 7, and by execution of the program (that is, playback), the holding member 2 and the nozzle 5 held by this can be moved as previously taught. The program stored in the ROM includes a program for deriving a command value for the rotational speed of the extrusion actuator 10, and the moving speed of the plunger 9 is controlled by execution of the program.

The controller 20 is connected with a seating sensor 21 that detects whether or not the reservoir 3 that is a cartridge is seated on the holding member 2, a discharge amount sensor 22 that measures a discharge amount, a bead width sensor 23 that measures a bead width, and a remaining amount sensor 24 for detecting a remaining amount of the viscous material 95 in the reservoir 3. In the present embodiment, a liquid reservoir portion 5a (see FIG. 1) for storing the viscous material 95 discharged from the nozzle 5 is provided at the tip of the nozzle 5. The discharge amount sensor 22 may be realized by an optical sensor that detects whether or not the liquid reservoir portion 5a is filled with the viscous material 95. In this case, the discharge amount sensor 22 is attached to the holding member 2. The bead width sensor 23 may be realized by an optical sensor that detects the bead width of the discharged viscous material 95. In this case, the bead width sensor 23 is attached to the holding member 2. As described above, in this embodiment, the moving amount of the plunger 9 is linearly correlated with the total amount of the viscous material 95 extruded from the reservoir 3 to the nozzle 5, or conversely, with the remaining amount of the viscous material 95 in the reservoir 3. Therefore, the remaining amount sensor 24 may be realized by a linear encoder that detects the moving amount of the plunger 9.

Figure 3:
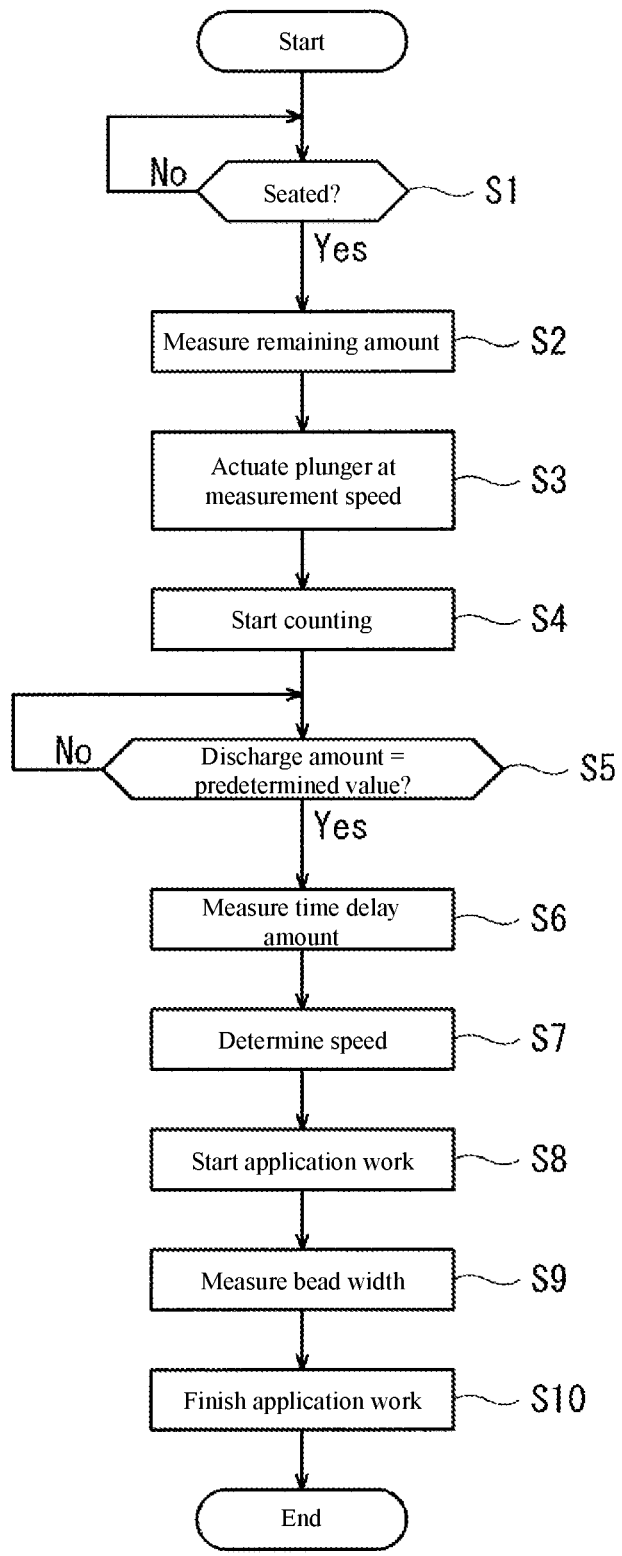
FIG. 3 illustrates a flowchart showing processing executed by a controller.

FIG. 3 is a flowchart showing processing executed by the controller 20. If it is detected that the reservoir 3 is seated on the holding member 2 based on the detection signal of the seating sensor 21 (S1: YES), the remaining amount of the viscous material 95 is detected by the remaining amount sensor 24 (S2). At the first time, the plunger is in the initial position, and the reservoir 3 is fully filled.

Next, the extrusion actuator 10 is actuated to operate the plunger 9 at a predetermined measurement speed (S3). As a result, the viscous material 95 is discharged from the nozzle 5. In the present embodiment, the viscous material 95 discharged from the nozzle 5 is accumulated in the liquid reservoir portion 5a. The counting of elapsed time (time delay amount) from the start of the operation of the plunger 9 is started by the internal timer of the controller 20 (S4). The time delay amount is the time from when the plunger 9 starts operating at the measurement speed until the discharge amount of the viscous material 95 reaches a predetermined value. In the present embodiment, the "time to reach a predetermined value" is the time until the discharge amount sensor 22 detects that the viscous material 95 is filled in the liquid reservoir portion 5a. When the discharge amount of the viscous material 95 reaches a predetermined value (S5: YES), the counting of elapsed time is finished and the elapsed time up to this point is measured as a time delay amount (S6).

Next, the operation speed of the plunger 9 is determined according to the measured time delay amount and other speed determination parameters. When the time delay amount is large, the viscosity of the viscous material 95 is relatively high and the discharge amount per unit time is small, so the operation speed of the plunger 9 is increased. The reverse is true when the time delay amount is small. The speed determination parameter will be described later.

Next, the application work is started using the determined speed (S8). In the application work, first, the nozzle moving mechanism 6 is actuated to move the nozzle 5 to the application start position of the viscous material 95. Thereafter, the extrusion actuator 10 is actuated so that the plunger 9 operates at the determined operation speed, and the moving actuator 8 is actuated so as to move the nozzle 5 at a predetermined moving speed. As a result, the viscous material 95 is applied to the workpiece 90 in a bead shape. During this application work, the bead width is measured by the bead width sensor 23 (S9). When the nozzle 5 moves to a predetermined application end position, the application work is terminated (S10). In this termination process, as an example, the extrusion actuator 10 is actuated so that the plunger 9 is slightly moved in the reverse direction, whereby the discharge of the viscous material 95 from the nozzle 5 is stopped. Once the flow is finished, the flow is restarted from step S1 to perform the next application work.

Thus, the time delay amount increases as the viscosity increases. Since the speed is determined according to parameters that are determined according to a viscosity, not parameters such as a viscosity having a wide distribution in the reservoir or a temperature that affects this, the amount of application of the viscous material per unit length in the bead extending direction, or the control accuracy of the bead width of the applied viscous material is improved.

Similarly to the above, the operation speed of the plunger 9 in the next application work is determined in advance of the next application work. That is, the remaining amount of the viscous material 95 in the reservoir 3 is measured (S2), and the time delay amount is measured by operating the plunger 9 at the measurement speed (S3 to S6). The measurement speed may be set to the same speed each time, and after the second time, the operation speed of the plunger 9 set in the previous application work may be used. In the speed setting after measuring the time delay amount (S7), the operation speed of the plunger is reset according to the measured time delay amount and the speed determination parameter.

The speed determination parameter includes the remaining amount of the viscous material 95 and the bead width measured during the previous application work. As the remaining amount of the viscous material 95 decreases, the discharge amount per unit time decreases even in the same discharge operation. When the remaining amount of the viscous material 95 decreases, the operation speed is corrected so as to increase. If the bead width is smaller than the required one, the operation speed is corrected so as to increase so that the discharge amount per unit time increases. In the next application work, the controller 20 actuates the extrusion actuator so as to operate the plunger 9 at the operation speed thus determined (S9). Note that the bead width is measured also during the application work (S10). In this way, the application work is repeated, and a plurality of bead-like viscous materials 95 are applied to the workpiece 90.

According to the above configuration, the operation speed of the plunger 9 is determined according to a time delay amount that is a parameter determined according to the viscosity, not a parameter such as a viscosity having a wide distribution in the reservoir 3 or a temperature or the like that affects the viscosity. Therefore, the control accuracy of the application amount of the viscous material per unit length in the bead extending direction or the bead width of the applied viscous material 95 is improved. In particular, if the temperature change range until the reservoir 3 becomes empty is large because it is stored frozen until just before loading, the viscous material 95 is prepared by mixing two liquids that cause a chemical reaction, or the viscous material 95 has a property of curing with the passage of time, the viscosity changes in a complicated manner with the passage of time. In this embodiment, since the operation speed is determined based on the time delay amount that appears as a result of the change, the discharge amount control accuracy can be maintained high.

The operation speed of the plunger 9 is determined according to not only the time delay amount, but also the remaining amount of the viscous material in the reservoir 3. It is possible to cope with a decrease in the discharge amount accompanying a decrease in the remaining amount, and it is possible to maintain a high control accuracy of the discharge amount until the viscous material 95 in the reservoir 3 becomes empty from the fully filled state.

In the present embodiment, also feedback control in which the bead width is measured is further incorporated, so that even if the bead width tolerance is small and severe, the bead width can be kept within the required range.

Note that the controller 20 stores a correspondence relationship between the time delay amount and the speed determination parameter and the operation speed of the plunger 9 in the memory. Based on the measured value, the controller 20 refers to this correspondence relationship and determines the operation speed. This "correspondence relationship" may be a map, a lookup table, or an arithmetic expression. The form of the correspondence relationship is not particularly limited, but the derivation of the correspondence relationship is performed before implementation in the memory of the controller 20 through an experiment.

Although the embodiment has been described so far, the above configuration is merely an example and can be appropriately changed, added, and/or deleted.

In the above embodiment, the operation speed of the plunger is variably set based on the time delay amount for controlling the bead width, but the moving speed of the nozzle 5 may be variably set in addition to or instead of the operation speed of the plunger.

REFERENCE SIGNS LIST 1 discharge device
2 holding member
2a base
3 reservoir
3a moveable wall
3b outflow port
4 extrusion mechanism
5 nozzle
5a liquid reservoir portion
6 nozzle moving mechanism
7 robot arm
8 moving actuator
9 plunger
10 extrusion actuator
11 motion conversion mechanism
20 controller
21 seating sensor
22 discharge amount sensor
23 bead width sensor
24 remaining amount sensor
90 workpiece
95 viscous material

The invention claimed is:

1. A viscous material discharge device that discharges a viscous material and applies the discharged viscous material to a workpiece in a bead shape, the viscous material discharge device comprising:
a reservoir that stores the viscous material;
an extrusion mechanism that extrudes the viscous material in the reservoir by a plunger;
a nozzle that discharges the viscous material;
a holding member that holds the nozzle;
a bead width sensor that measures a bead width of the discharged viscous material;
a nozzle moving mechanism that moves the holding member and the nozzle held by the holding member; and
processing circuitry configured to
control the plunger to operate at a measurement speed and discharge the viscous material from the nozzle before applying the viscous material to the workpiece;
measure a period of time, from when the plunger starts operating at the measurement speed until a discharge amount of the viscous material reaches a predetermined value, as a time delay amount; and
determine one of an operation speed of the plunger and/or a moving speed of the nozzle during application of the viscous material to the workpiece according to another speed determination parameter together with the time delay amount, the another speed determination parameter including the bead width of the viscous material measured while applying the viscous material to the workpiece.

2. A viscous material discharge device that discharges a viscous material and applies the discharged viscous material to a workpiece in a bead shape, the viscous material discharge device comprising:
a reservoir that stores the viscous material;
an extrusion mechanism that extrudes the viscous material in the reservoir by a plunger;
a nozzle that discharges the viscous material;
a holding member that holds the nozzle;
a remaining amount sensor that detects a remaining amount of the viscous material in the reservoir;
a nozzle moving mechanism that moves the holding member and the nozzle held by the holding member; and
processing circuitry configured to
control the plunger to operate at a measurement speed and discharge the viscous material from the nozzle before applying the viscous material to the workpiece;
measure a period of time, from when the plunger starts operating at the measurement speed until a discharge amount of the viscous material reaches a predetermined value, as a time delay amount;
measure the remaining amount of the viscous material to be discharged; and
determine one of an operation speed of the plunger and/or a moving speed of the nozzle during application of the viscous material to the workpiece according to another speed determination parameter together with the time delay amount, the another speed determination parameter including the remaining amount of the viscous material to be discharged.

3. The viscous material discharge device according to claim 1, wherein the processing circuitry controls a start of application work at the operation speed.

* * * * *